United States Patent
Oyarzabal et al.

(10) Patent No.: US 9,953,007 B2
(45) Date of Patent: *Apr. 24, 2018

(54) TEMPLATE-BASED CONTENT CREATION

(71) Applicant: International Business Machines Corporation, Armonk, NY (US)

(72) Inventors: Randy E. Oyarzabal, Rochester, MN (US); Jeffery A. Turner, Lexington, KY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 619 days.

This patent is subject to a terminal disclaimer.

(21) Appl. No.: 13/708,327

(22) Filed: Dec. 7, 2012

(65) Prior Publication Data

US 2013/0097485 A1 Apr. 18, 2013

Related U.S. Application Data

(63) Continuation of application No. 12/952,743, filed on Nov. 23, 2010, now abandoned.

(51) Int. Cl.
*G06F 17/21* (2006.01)
*G06F 17/24* (2006.01)

(52) U.S. Cl.
CPC ............ *G06F 17/211* (2013.01); *G06F 17/24* (2013.01); *G06F 17/246* (2013.01); *G06F 17/248* (2013.01)

(58) Field of Classification Search
CPC ............... G06F 17/2247; G06F 17/211; G06F 17/2235; G06F 17/24; G06F 17/218; G06F 17/248; G06F 17/30896; G06F 17/246

USPC ................. 715/234–235, 209, 227, 243, 255
See application file for complete search history.

(56) References Cited

U.S. PATENT DOCUMENTS

| | | | |
|---|---|---|---|
| 5,903,905 A | 5/1999 | Andersen et al. | |
| 6,067,531 A | 5/2000 | Hoyt et al. | |
| 6,457,030 B1 | 9/2002 | Adams et al. | |
| 6,873,992 B1 * | 3/2005 | Thomas | G06F 17/30887 |

(Continued)

FOREIGN PATENT DOCUMENTS

| GB | 2451117 A | 1/2009 |
|---|---|---|
| GB | 2458692 A | 9/2009 |

OTHER PUBLICATIONS

Miles et al., "Electronic Business Contracts between Services", Oct. 8, 2008, King's College London, UK, University of Lyon, France, and Lost Wax, UK, 14 pages.

(Continued)

*Primary Examiner* — Thu Huynh
(74) *Attorney, Agent, or Firm* — Patterson + Sheridan, LLP

(57) ABSTRACT

Methods, systems and program products for generating content from a user-created template. Embodiments of the invention may provide an interface configured to allow users to create templates, where the templates further include a user-specified formatting. Embodiments may receive a template created by a user using the provided interface, and responsive to receiving the template, may retrieve data associated with the variable fields in the received template. Embodiments may generate new content based on the received template and the retrieved data, where the generated new content is formatted according to the user-specified formatting in the received template.

3 Claims, 11 Drawing Sheets

(56) References Cited

U.S. PATENT DOCUMENTS

| | | |
|---|---|---|
| 7,069,234 B1 | 6/2006 | Cornelius et al. |
| 7,278,094 B1* | 10/2007 | Dreyer et al. ................. 715/234 |
| 7,313,540 B1 | 12/2007 | Hueler et al. |
| 7,322,007 B2* | 1/2008 | Schowtka .............. G06F 17/212 |
| | | 715/243 |
| 7,333,996 B2 | 2/2008 | Berry et al. |
| 7,707,494 B2 | 4/2010 | Ohta |
| 7,814,475 B2 | 10/2010 | Cohen et al. |
| 7,818,219 B2 | 10/2010 | Klivington et al. |
| 7,930,632 B2 | 4/2011 | Takashima et al. |
| 7,996,759 B2 | 8/2011 | Elkady |
| 8,196,030 B1* | 6/2012 | Wang ................. G06K 9/00442 |
| | | 345/581 |
| 8,365,080 B2 | 1/2013 | Karlson |
| 8,688,992 B2* | 4/2014 | Daniels ................. H04L 9/3247 |
| | | 713/175 |
| 2001/0034739 A1* | 10/2001 | Anecki .................. G06Q 10/10 |
| | | 715/205 |
| 2001/0051961 A1 | 12/2001 | Duxbury |
| 2002/0059253 A1 | 5/2002 | Albazz et al. |
| 2002/0083090 A1 | 6/2002 | Jeffrey et al. |
| 2002/0129056 A1* | 9/2002 | Conant .................. G06Q 30/06 |
| | | 715/255 |
| 2002/0143583 A1 | 10/2002 | Reader et al. |
| 2002/0178120 A1 | 11/2002 | Reid et al. |
| 2003/0018481 A1* | 1/2003 | Zhou ..................... G06F 17/243 |
| | | 715/223 |
| 2004/0068566 A1* | 4/2004 | Ogawa .............. H04L 29/12216 |
| | | 709/226 |
| 2004/0083119 A1 | 4/2004 | Schunder et al. |
| 2004/0085355 A1 | 5/2004 | Hermes et al. |
| 2004/0088650 A1 | 5/2004 | Killen et al. |
| 2004/0098704 A1 | 5/2004 | Becker et al. |
| 2004/0249664 A1* | 12/2004 | Broverman ....... G06F 17/30011 |
| | | 705/2 |
| 2005/0091143 A1 | 4/2005 | Schmidt et al. |
| 2005/0094207 A1 | 5/2005 | Lo et al. |
| 2005/0147442 A1 | 7/2005 | Walker et al. |
| 2005/0207776 A1* | 9/2005 | Nomura .................. G07F 17/26 |
| | | 399/79 |
| 2006/0009999 A1 | 1/2006 | Gee et al. |
| 2006/0020592 A1 | 1/2006 | Gee et al. |
| 2006/0200763 A1* | 9/2006 | Michaelsen ........... G06F 17/217 |
| | | 715/244 |
| 2006/0242419 A1 | 10/2006 | Gaffey et al. |
| 2007/0028175 A1* | 2/2007 | Moore .................. G06F 9/5072 |
| | | 715/733 |
| 2007/0038929 A1* | 2/2007 | Miyazawa ............ G06F 17/248 |
| | | 715/210 |
| 2007/0124661 A1* | 5/2007 | Hackworth ....... G06F 17/30887 |
| | | 715/210 |
| 2007/0156463 A1 | 7/2007 | Burton et al. |
| 2007/0157079 A1 | 7/2007 | Baker |
| 2007/0204013 A1* | 8/2007 | Castrucci ........... G06F 17/3089 |
| | | 709/219 |
| 2007/0265969 A1 | 11/2007 | Horwat et al. |
| 2007/0282627 A1* | 12/2007 | Greenstein ............. G06Q 30/02 |
| | | 717/101 |
| 2007/0299878 A1 | 12/2007 | Berry et al. |
| 2007/0300146 A1 | 12/2007 | Yamanakajima |
| 2008/0126401 A1 | 5/2008 | Walker et al. |
| 2009/0024917 A1 | 1/2009 | Giannetti |
| 2009/0070666 A1 | 3/2009 | Eilers et al. |
| 2009/0190858 A1 | 7/2009 | Moody et al. |
| 2009/0300471 A1* | 12/2009 | Dettinger ............ G06F 17/2247 |
| | | 715/200 |
| 2010/0070930 A1 | 3/2010 | Thibault |
| 2010/0088155 A1 | 4/2010 | Pyle et al. |
| 2010/0313119 A1* | 12/2010 | Baldwin ............... G06F 17/248 |
| | | 715/256 |
| 2012/0042239 A1* | 2/2012 | O'Brien ................ G06F 17/248 |
| | | 715/243 |
| 2012/0131426 A1 | 5/2012 | Oyarzabal et al. |
| 2012/0131434 A1 | 5/2012 | Oyarzabal et al. |
| 2012/0131445 A1 | 5/2012 | Oyarzabal et al. |
| 2013/0111325 A1* | 5/2013 | Yue et al. ..................... 715/234 |
| 2013/0185621 A1 | 7/2013 | Oyarzabal et al. |
| 2015/0213568 A1* | 7/2015 | Follis ..................... G06Q 50/18 |
| | | 705/311 |

OTHER PUBLICATIONS

"Using the Administrator Workbench to Manage Contracts Under Negotiation", Oracle Service Contracts User Guide, Feb. 1, 2007, Oracle, Release 12.1, Part No. E13458-04, 10 pages.

* cited by examiner

FIG. 11

DSTDOUD: [ DOU-ID-12345 ] Exemplary Service Agreement ver.2.4 (2010) - Customer APPROVED the DST DOU

File Edit View Insert Format Tools Actions Help Adobe PDF
Reply | Reply to All | Forward Sent: Wed 9/15/2010 12:15 PM From: Document Creation Component
To: Document Administrator
Cc:
Subject: DSTDOUD: [ DOU-ID-12345 ] Exemplary Service Agreement ver.2.4 (2010) - Customer APPROVED the DST DOU The DST DOU for Exemplary Service Agreement Version 2.4 has been approved by the customer.

Please use the "Open DOU Document" button below to review the DOU and provide DST signoff.
[Open DOU Document]

To access the DST DOU Application, directly, you may use the following links:

-Link to Document Creation Component

| Code | Status | Description |
|------|----------|-----------------------|
| 13579 | APPROVED | Web Hosting Service |
| 97521 | APPROVED | Web Hosting Hardware |
| 24680 | APPROVED | Support Services |
| 08642 | APPROVED | Terms and Conditions |

TEMPLATE-BASED CONTENT CREATION

CROSS-REFERENCED TO RELATED APPLICATIONS

This application is a continuation of co-pending U.S. patent application Ser. No. 12/952,743, filed Date Nov. 23, 2011. The aforementioned related patent application is herein incorporated by reference in its entirety.

BACKGROUND

Embodiments of the invention generally relate to document generation, and more specifically, to techniques for creating content using templates.

The creation of a service agreement is typically a complex project involving multiple stakeholders, each with different goals and concerns. Once the stakeholders reach a common agreement regarding various solution components of the project, such an agreement may be memorialized in a document of understanding. However, because each of the stakeholders may wish to modify the document of understanding with proposed amendments before the document is finalized, multiple inconsistent variations of the document may be created. Furthermore, reconciling these different variations of the document is often a time consuming and error prone process. Additionally, many service agreements are for a fixed period of time (e.g., one year), and once a service agreement expires, a new or updated document of understanding may be created to renew the service agreement. Without such updates, the document of understanding may quickly become obsolete and contain various inaccuracies and outdated information.

Additionally, many documents of understanding include similar formatting styles. For example two exemplary documents may use the same font, the same section header style (e.g., centered, capitalized text), the same margins, and so on. Additionally, these exemplary documents may contain tables containing similar data, and formatted in a similar way. For example, both documents may contain tables containing relevant pricing data for their associated document of understanding, and these tables may be formatted (e.g., text alignment, column width, etc.) in the same way as well. However, since the creation of such documents is currently a manual process, these formatting styles are typically recreated for each separate document of understanding. Such a manual process often consumes a significant amount of time and resources, and is often an error-prone process as well.

SUMMARY

Embodiments of the invention provide a method, system and program product for creating content. The method, system and program product include providing a interface allowing a user to interactively create a template for use in creating content, wherein the template contains a plurality of fields including at least one variable field displayed with formatting attributes given to content of the variable field when displayed in the interface. Additionally, the method, system and program product include receiving a first template created using the provided interface, and for each variable field of the received first template, retrieving one or more data values associated with the variable field. The method, system and program product also include generating new content based on the received first template and the retrieved one or more data values. Furthermore, generating new content includes, for each variable field in the received first template, inserting the associated one or more data values into the generated new content, at a position corresponding to a placement position of the variable field in the received first template; and formatting the associated one or more data values, based on the formatting attributes specified for the variable field.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 11 is a screenshot of an exemplary notification including a table generated using the table template of FIG. 10, according to one embodiment of the present invention.

DETAILED DESCRIPTION

Figure 1:
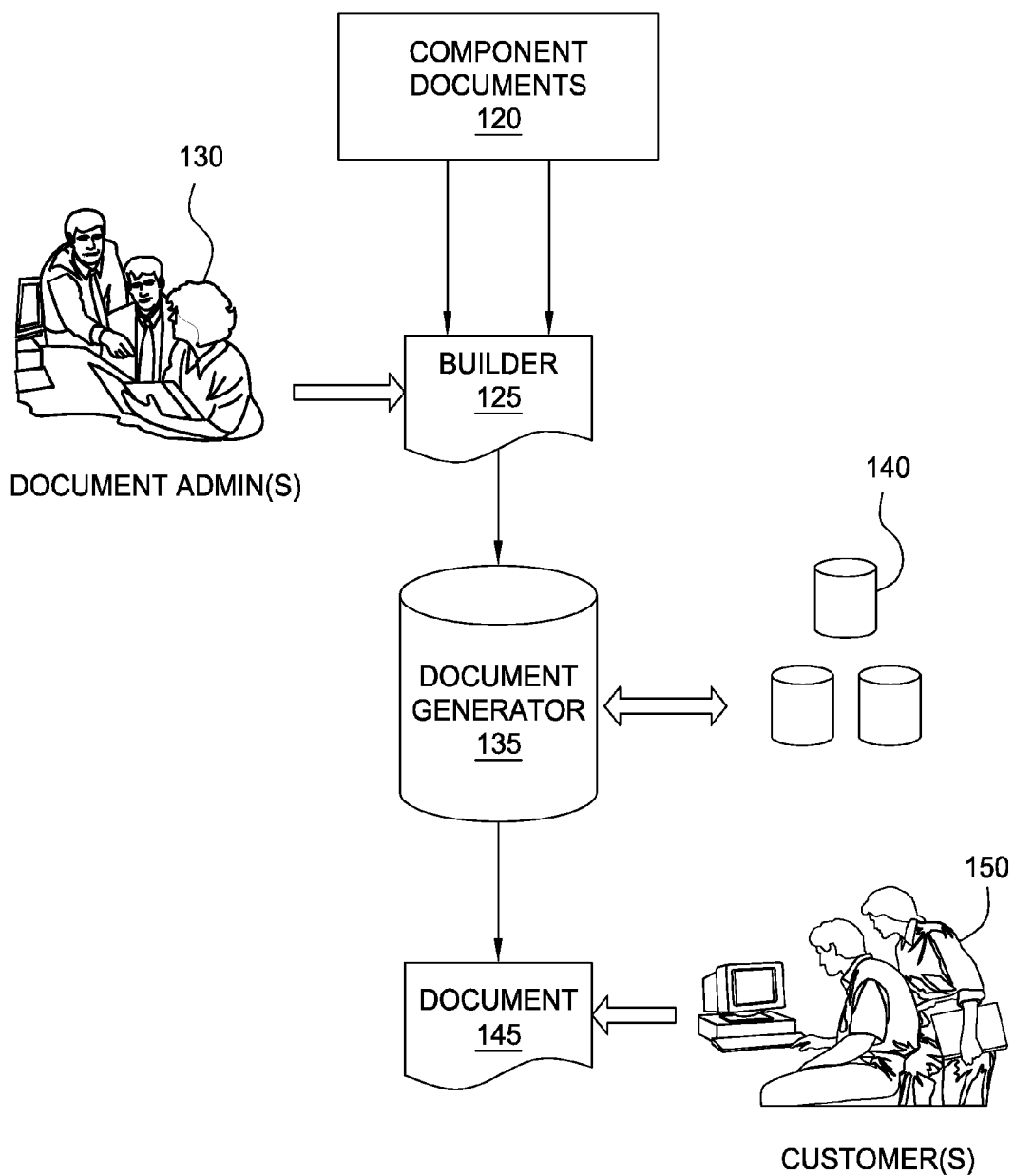
FIG. 1 is a diagram illustrating the creation of a document, according to one embodiment of the present invention.

Embodiments of the invention provide techniques for creating content through the use of templates. Embodiments may provide a graphical interface configured to allow a user to create a template for use in creating content. Such a template may include one or more variable fields, which specify a particular data type. Generally, when content is created using the template, each variable field may be replaced with one or more data values relating to the created content and of the particular data type specified by the variable field. The graphical interface may display the one or more variable fields as having a particular user-specified formatting. For example, if a user wishes the one or more data values in the subsequently-created content to be italicized, the user may apply such a formatting to the variable field associated with those data values in the template, and such formatting may be reflected by the graphical interface.

Upon receiving a template created by a user using the graphical interface, embodiments may retrieve data values associated with each of the variable fields in the received template. Embodiments may then generate new content based on the received template and the retrieved data values, by inserting the data values in the generated new content at a position corresponding to a placement position of the variable field in the received first template. Additionally, embodiments may format the data values in the generated new content, based on the formatting specified by the user for the associated variable field.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a document creation component) or related data available in the cloud. For example, the document creation component could execute on a computing system in the cloud and allow users to create templates for use in generating content using a graphical interface. In such a case, a document creation component could receive a user-created template, generate new content based on the template, and store the generated content at a storage location in the cloud. Doing so allows users to access the generated new content from any computing system attached to a network connected to the cloud (e.g., the Internet).

Referring now to FIG. 1, FIG. 1 is a flow diagram illustrating a document creation method, according to one embodiment of the present invention. For purposes of this example, assume that the generated document is a document of understanding related to an exemplary service agreement. As shown, the method 100 begins with the document administrators 130 interacting with the builder 125 to construct an initial document. Generally, the builder 125 may receive selections of components 120 from a user (e.g., the document administrators 130), and may populate each of these selections with data. In one embodiment of the invention, the builder 125 may display a list of available component documents 120 to the user and allow the user to select which component(s) to incorporate in the initial document. Generally, the components 120 define one or more attributes of the document of understanding. For example, the components 120 may include a billing component, which contains billing information related to a particular service offering. If the user selects the billing component, the builder 125 may further prompt the user for the information used to populate the billing component (e.g., an initial cost of the service agreement, a monthly cost of the service agreement, etc.).

Once the selected component 120 is populated, the builder 125 may insert the populated component into the initial document. The document administrators 130 may continue to interact with the builder 125 to add components 120 to the initial document until the initial document is complete. The document administrators 130 may additionally use the builder 125 to arrange the components in the initial document. For example, an initial document may contain two components: a billing component, and a billing component header. In such an example, a document administrator 130 may wish to arrange the components such that the billing component header precedes the billing component itself.

As discussed above, the builder 125 may populate certain information in the initial document based on user input. Additionally, the document generator 135 may also interact with one or more other applications 140 (e.g., a database) in order to populate portions of the final document. For example, the document generator 135 may retrieve updated pricing information from a pricing database 140, and may use the updated pricing information to populate fields in the billing component. In one embodiment of the present invention, the document administrators 130 may use the builder 125 to specify a particular source 140 to retrieve information from. For example, the document administrators 130 may specify that the billing component in the initial document should be populated using a particular database table related to pricing information.

Once all the components 120 have been added to the initial document and once any empty fields in the initial document are populated, the initial document is sent to the document generator 135 to create a final document. As referred to herein, the final document generally refers to the document of understanding generated according to embodiments of the invention. That is, although a first draft of the document of understanding has been created, such a draft may not be marked as active (i.e., will not take effect) until both parties to the document have agreed to its terms. The final document 145 may then be sent to the customers 150 for approval. In one embodiment, rather than sending a separate instance of the document of understanding to the customers 150 for approval, embodiments may send a reference to a single, centralized copy of the document.

Upon receiving the final document 145 (or a reference to the final document), if the customers 150 wish to modify the final document 145, the customers 150 may reject the final document 145 and return the document to the document administrators 130 for revisions. The document administrators 130 may use the builder 125 to revise the components in the initial document, based on the revisions specified by the customer 150. A revised document may then be generated using the document generator 135, and the revised document may be submitted to the customers 150 for approval. Upon approval of the final document 145 (or the revised document), the final document 145 is marked as active and takes effect as the document of understanding for the exemplary service agreement.

Advantageously, by doing this, embodiments of the invention may more efficiently create a document of understanding for a particular project by using existing components 120 and data. For example, an existing solution for adding a billing section to a new document of understanding is to manually create the billing section in the document, research updated pricing data, and manually populate the billing section with the updated pricing data. In contrast, embodiments may more efficiently create the document by adding a billing component from the plurality of components 120 to the initial document, and then automatically populating the billing component with pricing data retrieved from a database 140. By doing this, embodiments of the invention may more efficiently create the document of understanding. Additionally, because embodiments create a single, centralized document of understanding, any revisions made to the document will be incorporated into the centralized copy of the document, thus preventing the creation of multiple inconsistent versions of the document.

Figure 2:
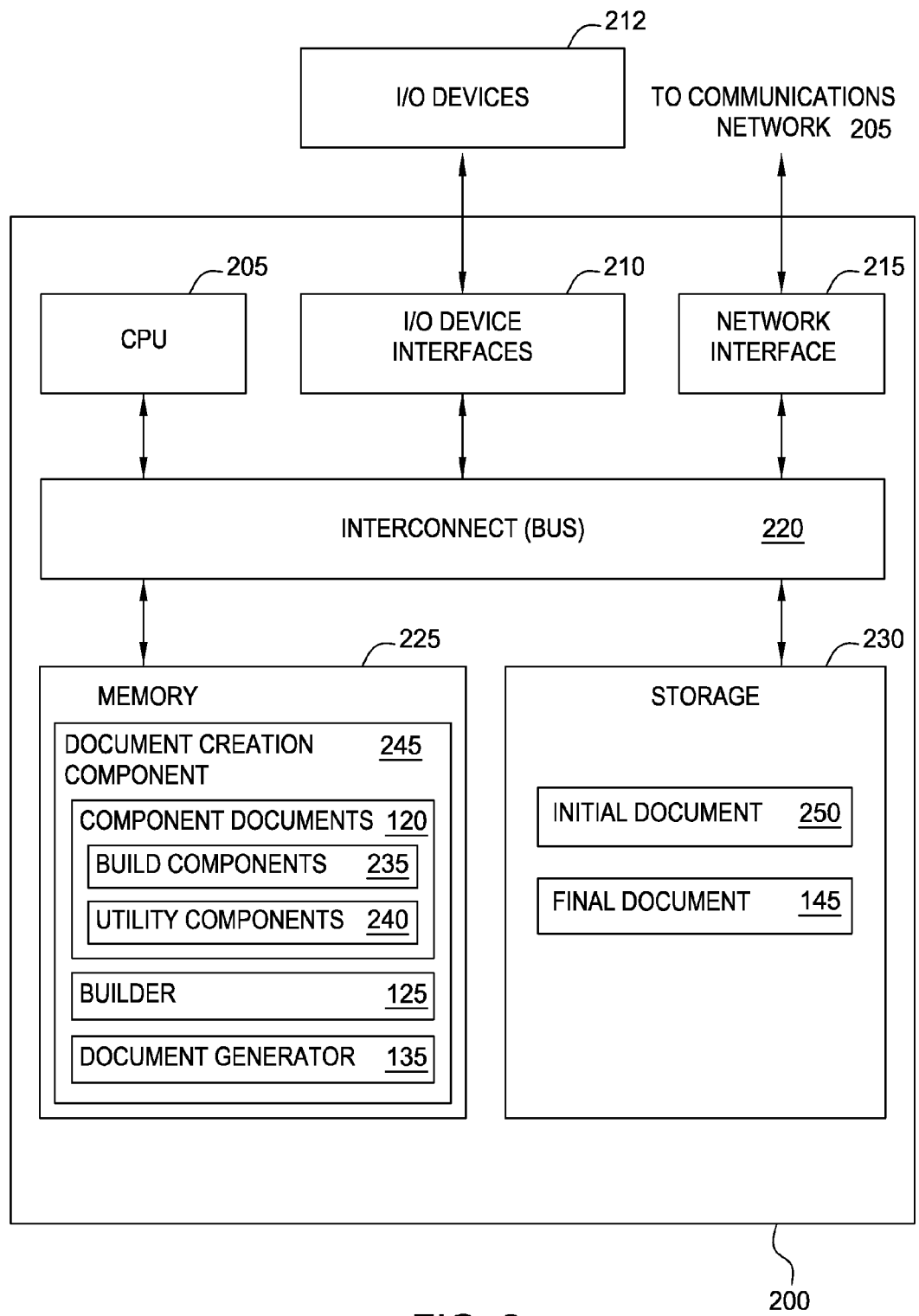
FIG. 2 is a block diagram of components of a computer system configured to run a document creation component, according to one embodiment of the present invention.

FIG. 2 is a block diagram of components of a computer system configured to run a document creation component, according to one embodiment of the present invention. As shown, the document creation system 200 includes, without limitation, a central processing unit (CPU) 205, a network interface 215, an interconnect 220, a memory 225, and storage 230. The document creation system 200 may also include an I/O devices interface 210 used to connect I/O devices 212 to the compute node 130. I/O devices 212 may represent a variety of input and output devices, including keyboards, mice, visual displays, printers and so on. The document creation system 200 may connect to the network 215 (e.g., the Internet) using the network interface 215.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. Furthermore, CPU 205 may be any processor capable of performing the functions described herein. Although memory 225 is shown as a single entity, memory 225 may include one or more memory devices having blocks of memory associated with physical addresses, such as random access memory (RAM), read only memory (ROM), flash memory or other types of volatile and/or non-volatile memory. Storage 230, such as a hard disk drive, solid state device (SSD), or flash memory storage drive, may store non-volatile data. Furthermore, as will be understood by one of ordinary skill in the art, any computer system capable of performing the functions described herein may be used.

In the pictured embodiment, memory 225 contains a document creation component 245, which in turn contains component documents 120, a builder 125, and a document generator 135. The component documents 120 contain build components 235 and utility components 240. The build components 235 are generally components pertaining to aspects of a service agreement, such as, without limitation, billing, hardware, and services. The utility components 240, on the other hand, are components pertaining to presentation and content of a created document, such as templates and service offerings. Additionally, storage 230 contains an initial document 250 and a final document 145. Furthermore, although various elements are shown as residing in either memory 225 or storage 230, such a depiction is without limitation and is merely for illustrative purposes.

Generally, users (e.g., document administrators) may use the document creation component 245 to create an initial document 250. More specifically, the builder 125 may present the user with a plurality of component documents 120, which may include both build components 235 and utility components 240, and allow users to select particular component documents for inclusion in the initial document 250. Upon receiving a selection of a particular component document 120, the builder 125 may add the selected component document 120 to the initial document 250. Additionally, the builder 125 may prompt the user regarding a placement in the initial document 250 to insert a selected component document 120. For example, if the user has already inserted a header for a billing section into the initial document 250, the user may then specify that a billing section itself should be inserted immediately following the header.

Additionally, the document creation component 245 may prompt the user for data with which to populate the selected component documents 120. For instance, an exemplary build component 235 may be a services component, which contains a list of services to be provided as part of a service agreement. In such an example, the document creation component 245 may prompt the user for which particular services should be included in the initial document 250. For example, a particular service agreement may include basic support services for an initial period of time, and may then include premium support services thereafter. In such a situation, the user may add two different service components to the initial document 250: one service component for the basic support service and a second service component for the premium support service. Additionally, the document creation component 245 may prompt the user for metadata about the provided services. For example, the metadata may include, without limitation, information about the service components such as when each service begins, a duration of each service, etc.

Once the user finishes adding component documents 120 to the initial document 250, the document generator 135 may generate a final document of understanding 145, based on the initial document 250. The document generator 135 may generate the final document 145 using a utility component 240 (e.g., such as a template). For example, the final document 145 may contain a billing section that includes a table detailing pricing information related to the service agreement. In such an example, the document generator 135 may generate the table with particular formatting specified by a particular utility component 240, such as a table template.

Additionally, the document generator 135 may query other applications (e.g., a database accessible over the communications network 205) and retrieve data for use in populating portions of the final document 145. For example, an exemplary initial document 250 may contain a billing section for a particular service agreement. In such an example, the document generator 135 may retrieve updated pricing information pertaining to the service agreement from an external database, and may populate a corresponding section of the final document 145 based on the retrieved pricing information. By doing this, embodiments of the invention may save the user from having to expend time and effort in manually retrieving the updated pricing information when creating a document of understanding. Furthermore, by retrieving updated information at the time the final document 145 is created, embodiments help to ensure the accuracy of information in the created document of understanding.

Figure 3:
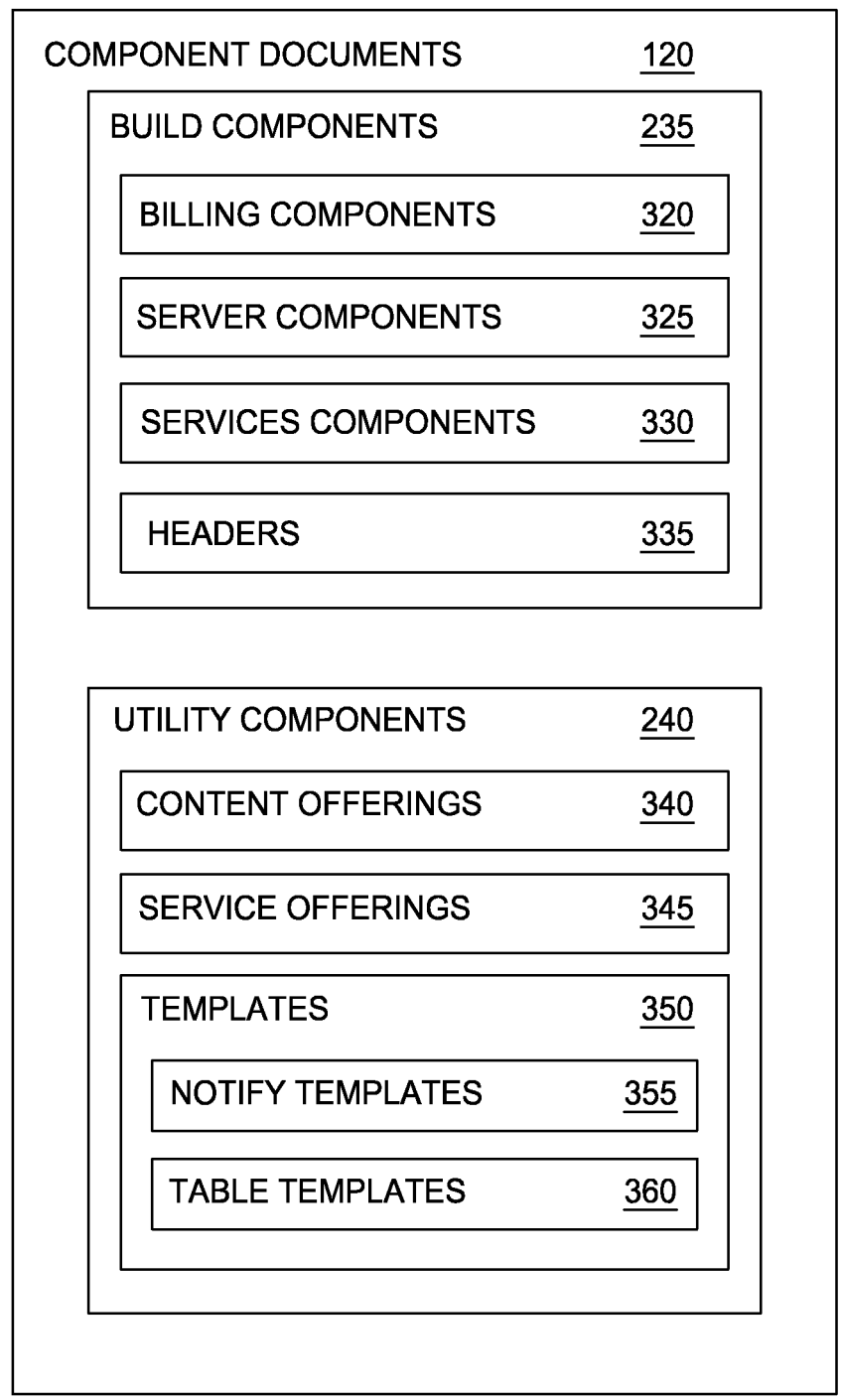
FIG. 3 is a block diagram of an exemplary embodiment of the components of FIG. 1, according to one embodiment of the present invention.

FIG. 3 is a block diagram of an exemplary embodiment of the components of FIG. 1, according to one embodiment of the present invention. As shown, the components 120 contain build components 235 and utility components 240. The build components 235 contain billing components 320, server components 325, services components 330, and headers 335. The billing components 320 generally relate to any billing structure involved in a service agreement including, but not limited to, fixed costs, recurring costs (e.g., monthly costs), and per-use costs. The server components 325 may relate to any server hardware provided as part of the service agreement. Such server hardware may include, without limitation, standalone computer systems, clustered computer systems, virtual computer systems, and cloud computer systems. The services components 330 generally relate to any services to be provided as part of the service agreement. For example, a service component 330 may specify a type of customer support (e.g., basic support, premium support, etc.) provided as part of the service agreement. As a second example, an exemplary service component 330 may specify computing services, such as web hosting, database access, shell access, etc., to be provided as part of the service agreement. The headers 335 generally include section headers for use in the created document of understanding.

As discussed above, the utility components 240 generally contain components used in creating the document of understanding. The utility components 240 contain content offerings 340, service offerings 345, and templates 350. Content offerings 340 generally include content that may be inserted into the document of understanding. For example, content offerings 340 may include, without limitation, formatted text such as assumptions of the service agreement, the terms agreed to, legal form language (e.g., a disclaimer), graphics (e.g., a company logo), and links (e.g., a hyperlink to a company's webpage). In one embodiment, content offerings 340 further contains multimedia content, such as audio content, video content, and animated content. Of course, these examples are for illustrative purposes only, and are without limitation. Furthermore, one of ordinary skill in the art will quickly understand that content offerings 340 may include combinations of these and other content types as well. For example, the content offerings 340 may include an interactive animation containing formatted text that, when accessed by a user, links to a particular webpage.

Additionally, the service offerings 345 may include potential services that may be offered as part of the service agreement. As an example, a particular business may potentially offer both web hosting and database services, which may be reflected in the corresponding service offerings 345 for the particular business. In constructing an initial document 250, the builder 125 may reference these potential service offerings 345 and present them to a user for selection (e.g., using a user interface). If the user then selects the web hosting service, the builder 125 may insert a corresponding service component 330 into the initial document, based on the user's selection.

The content creation component 245 may also use templates in constructing the final document 145. In the depicted example, the templates 350 contain notify templates 355 and table templates 360. The notify templates 355 generally relate to the presentation of any notifications associated with the document creation component 245. For instance, once a final document 145 is created, the document creation component 245 may submit the final document 145 to a customer for approval. As discussed above, in one embodiment, the document creation component 245 sends a reference to a single, centralized copy of the final document 145 to the customer for approval, rather than a separate instance of the final document 145. Upon approval of the document 145 by the customer, the document creation component 245 may generate a notification using a notify template 355 to notify the document administrators of the customer approval.

In one embodiment, the document creation component 245 may submit the final document 145 to the customer using electronic correspondence, such as email. In such an embodiment, a document administrator may specify a particular notify template 355 during the creation of the document, and once the final document 145 is complete, the document creation component 245 may generate an email to the customer using a specified notify template 355 and containing a reference to the final document 145. As a second example, once the customer either rejects or approves the final document 145, the document creation component 245 may generate a corresponding notification to the document administrator using a notify template 355.

The table templates 360 may be used for generating tables related to the final document 145. Generally, a table template 360 may contain formatting information for use in the creation of a table. Without limitation, such formatting information may include fonts, margins, borders, shading, and so on. Additionally, different tables in the final document 145 may be generated using different table templates 360. Furthermore, although the table templates 360 may be used for the creation of tables in the final document 145, the table templates 360 may also be used for other tables, such as a table included in a notification. For example, a notification sent to a customer upon completion of the final document may contain a table including information on the service agreement (e.g., a response data, contact information, etc.), and such a table may be generated using a particular table template 360.

Figure 4:
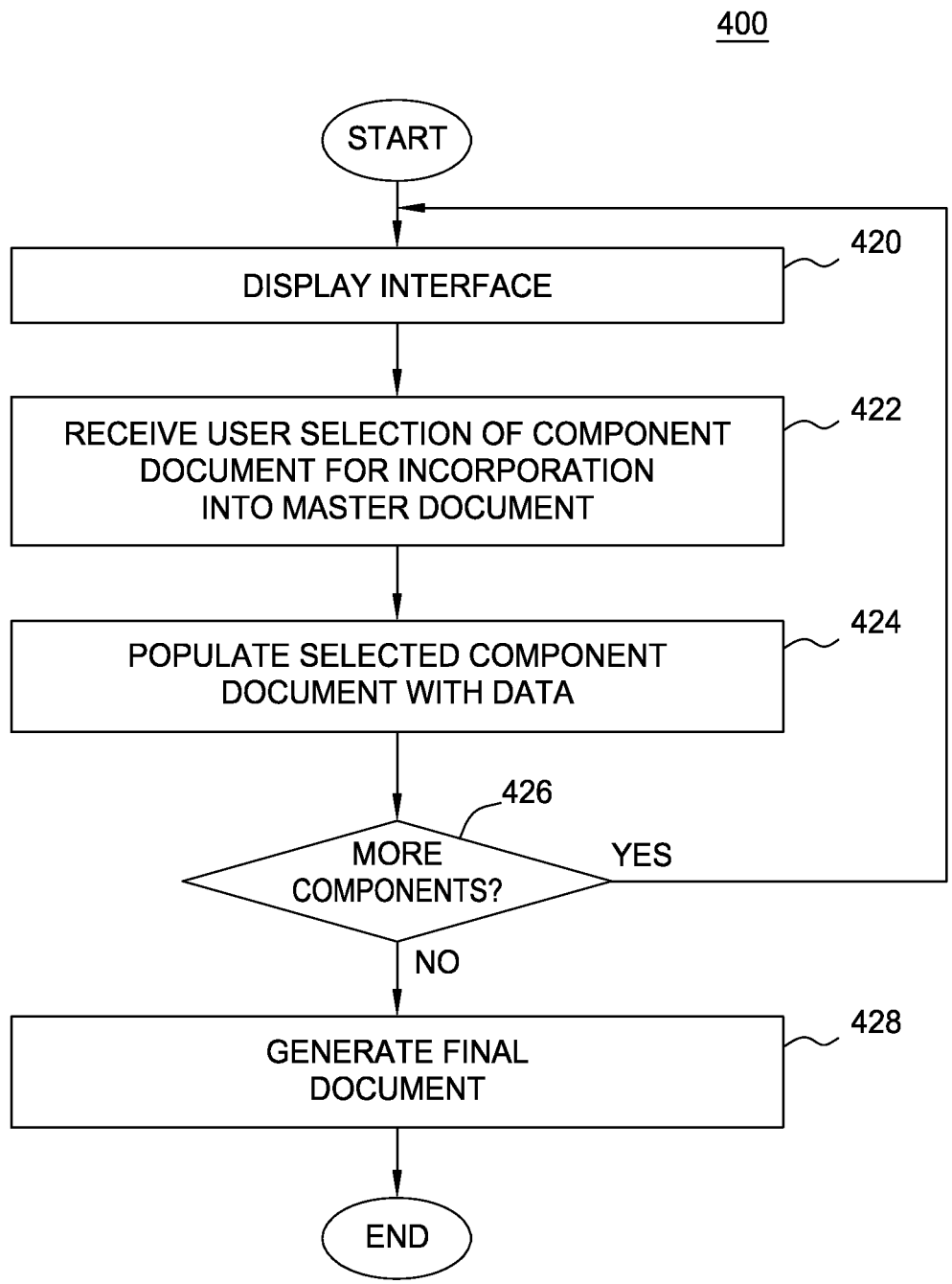
FIG. 4 is a flow diagram illustrating a method of creating a master document, according to one embodiment of the present invention.

FIG. 4 is a flow diagram illustrating a method of creating a master document, according to one embodiment of the present invention. As shown, the method 400 begins at step 420, where the document creation component 245 generates an interface for display to a user (e.g., using an I/O device 212, such as a monitor). The displayed interface may generally contain component documents 120 that may be inserted into an initial document 250. For example, the interface may contain a listing of available content offerings 340 and service offerings 345. The document creation component 245 then receives a user selection of a component document 120 for incorporation into the initial document 250 (step 422).

Once the document creation component 245 receives the user selection of a component document 120, the document creation component 245 populates the selected component document with data (step 424). As discussed above, the document creation component 245 may populate the component document with data retrieved from an external source (e.g., a database). Additionally, the document creation component 245 may further prompt the user for additional information, and may populate the component document 120 using the additional information specified by the user.

The document creation component 245 then determines whether the user wishes to add more components to the initial document 250 (step 426). In one embodiment, the document creation component 245 assumes that the user wishes to continue adding component documents to the initial document 250 until the user indicates otherwise (e.g., clicking a "Done" button). In another embodiment, the document creation component 245 may prompt the user to determine whether the user wishes to add another component document 120. If the user indicates he wishes to add another component document 120, the method begins again at step 420, where the document creation component 245 displays an interface containing component documents 120 that may be inserted into the initial document 250.

If, instead, the user indicates he does not wish to add any more component documents, the document creation component 245 generates the final document 145 based on the initial document 250 (step 428). Additionally, the final document 145 may be generated using one or more templates 350. For example, the document creation component 245 may determine the formatting for a particular table in the final document 145 using a table template 360 specified in the corresponding initial document 250. In one embodiment, the document creation component 245 may use a default table template 360 for creating tables in the final document 145, if no table template 360 is specified in the initial document 250. One the final document is generated, the method 400 ends.

Advantageously, the method 400 may create the document of understanding more efficiently than known solutions. For example, rather than recreating the existing component documents 120, the document creation component 245 creates the initial document 250 using a selection of existing component documents 120. The method 400 also improves the efficiency of the document creation by automatically formatting content in the final document 145 based on the templates 350. For example, a particular pricing structure in the final document 145 may include a table containing various pricing information. The appearance of such a table may be modified by adjusting formatting elements such as borders, cell shading, font style, font size, text alignment, and so on. However, rather than having the user manually adjust each of these elements for the table, the method 400 allows the user to simply specify a table template 360 for use in the creation of the table. As such, the method 400 more efficiently creates the final document 145. Furthermore, the component documents 120 may be automatically populated with information from an external source (e.g., a database). This may result in a substantial time savings for the user, as the user may avoid manually locating and retrieving the external information.

As an additional advantage, by automatically populating the components 120 with up-to-date information from an external source, the method 400 improves the quality of the document of understanding by ensuring that current information is used in the creation of the document. For example, the prices of particular services and hardware offered by a business may be frequently updated based on current market value. By automatically retrieving the most up-to-date prices when the final document is created 145, the method 400 ensures that the final document 145 contains accurate pricing information.

Figure 5:
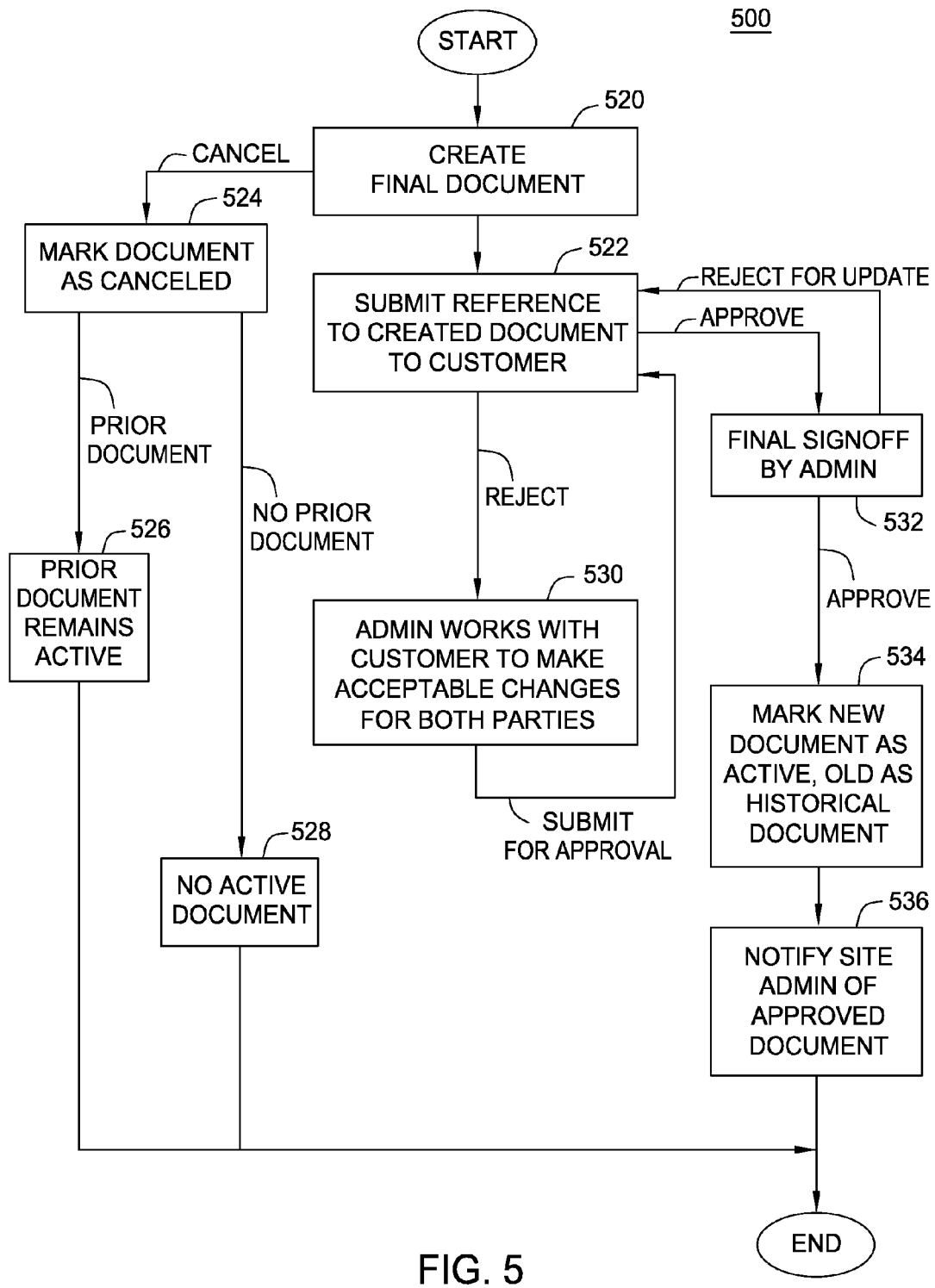
FIG. 5 is a flow diagram illustrating a method of approving a document, according to one embodiment of the present invention.

FIG. 5 is a flow diagram illustrating a method of approving a document, according to one embodiment of the present invention. For the purposes of this example, assume that the final document is created by a business, and that the final document represents a document of understanding between the business and a customer. As shown, the method 500 begins at step 520, where the document creation component 245 creates a final document 145. In one embodiment of the invention, the document creation component 245 creates the final document 145 by using the method 400, as discussed above. Once the final document 145 is created, the document creation component 245 submits a reference to the final document 145 to the customer for approval (step 522). That is, in the method 500, the document creation component 245 maintains a single, centralized copy of the final document 145, and rather than sending a separate instance of the final document 145 to the customer, the document creation component 245 sends a reference to the single instance of the final document 145.

Upon receiving the reference to the final document 145, the customer may take one of several courses of action. For instance, the customer may reject the final document 145, whereby a document administrator from the business works with the customer to make acceptable changes to the final document 145 (step 530). For example, a first draft of the final document 145 may specify that the business will provide computer hardware with 12 gigabytes of memory. However, after reviewing the pricing information in the final document 145, the customer may reject the first draft of the final document 145 and request only 8 gigabytes of memory (along with a corresponding reduced price). Once the document administrator for the business updates the final document 145, the method returns to step 522, where the document is again submitted to the customer for approval.

Additionally, upon receiving reference to the final document 145 from the business, the customer may approve of the final document 145. In one embodiment, upon receiving the approval from the customer, the document creation component 245 may generate a notification to a document administrator. For instance, such a notification may be generated based on a particular notify template 355. Once the customer approves of the final document 145, the document administrator is prompted for a final signoff on the final document 145 (step 532). If the administrator rejects the final document 145, the administrator may revise the final document 145. For example, when reviewing the final document 145 for a final approval, the document administrator may notice an oversight in the document, and accordingly reject the final document 145 to correct the oversight. The method then returns to step 522, where the document is again submitted to the customer for approval.

If instead the administrator approves the final document 145, the final document 145 is marked as an active document of understanding between the business and the customer (step 534). Additionally, any previously active document of understanding for the same service agreement is marked as an inactive historical document at this point. That is, because the final document 145 replaces the previously active document of understanding, the previously active document is marked as inactive. Once the final document is marked as active, the document creation component 245 notifies the document administrator accordingly (step 536). As discussed above, such a notification may be generated using a notify template 355. For instance, the document creation component 245 may contain settings that allow document administrator to configure default notify templates 355 for use in notifications the document creation component 245 sends. As an example, a document administrator may configure the document creation component 245 so that notifications sent when a customer rejects a document use a first template, and notifications sent when a customer accepts a document use a second, different template. Additionally, in such an embodiment, the settings may allow the document administrator to configure a specific notify template 355 for use with particular notifications the document creation component 245 sends.

On the other hand, upon receiving the reference to the final 145 document, the customer may decide to cancel the service agreement altogether. In this scenario, the document creation component 245 marks the final document as cancelled (step 524). If a prior document of understanding exists and is already active, the prior document of understanding remains active (step 526), and the method 500 ends. For example, the final document 145 in the method 500 may represent a revised version of an existing service agreement between the business and the customer and the final document 145, if approved, would replace the existing, active service agreement between the two. In such an example, upon cancelling the final document 145 (i.e., the revised version of the service agreement), the previous existing service agreement between the business and the customer would remain in effect. If instead no prior document of understanding exists, or if the existing prior document was not active, then no document will remain active between the business and the customer (step 528), and the method ends.

Template Creation and Processing

As discussed above, in one embodiment of the invention, the documentation creation component 245 may dynamically generate content using one or mote templates 350. For instance, the document creation component 245 may generate a notification using a notify template 355 in response to the occurrence of a particular event. For example, upon receiving an approval from a customer for a created document of understanding, the document creation component 245 may generate a notification to the document administrators using a particular notify template 355 that contains information such as an ID number for the document of understanding, a name of the project associated with the document, a version number of the approved document, and so on. As a second example, the document creation component 245 may also dynamically generate tables using a template 355, such as a table template 360. Continuing the above example, the generated notification may further include a table that is dynamically populated with information related to the particular document of understanding, and the table and the information contained therein may be formatted according to a particular table template 360.

Figure 6:
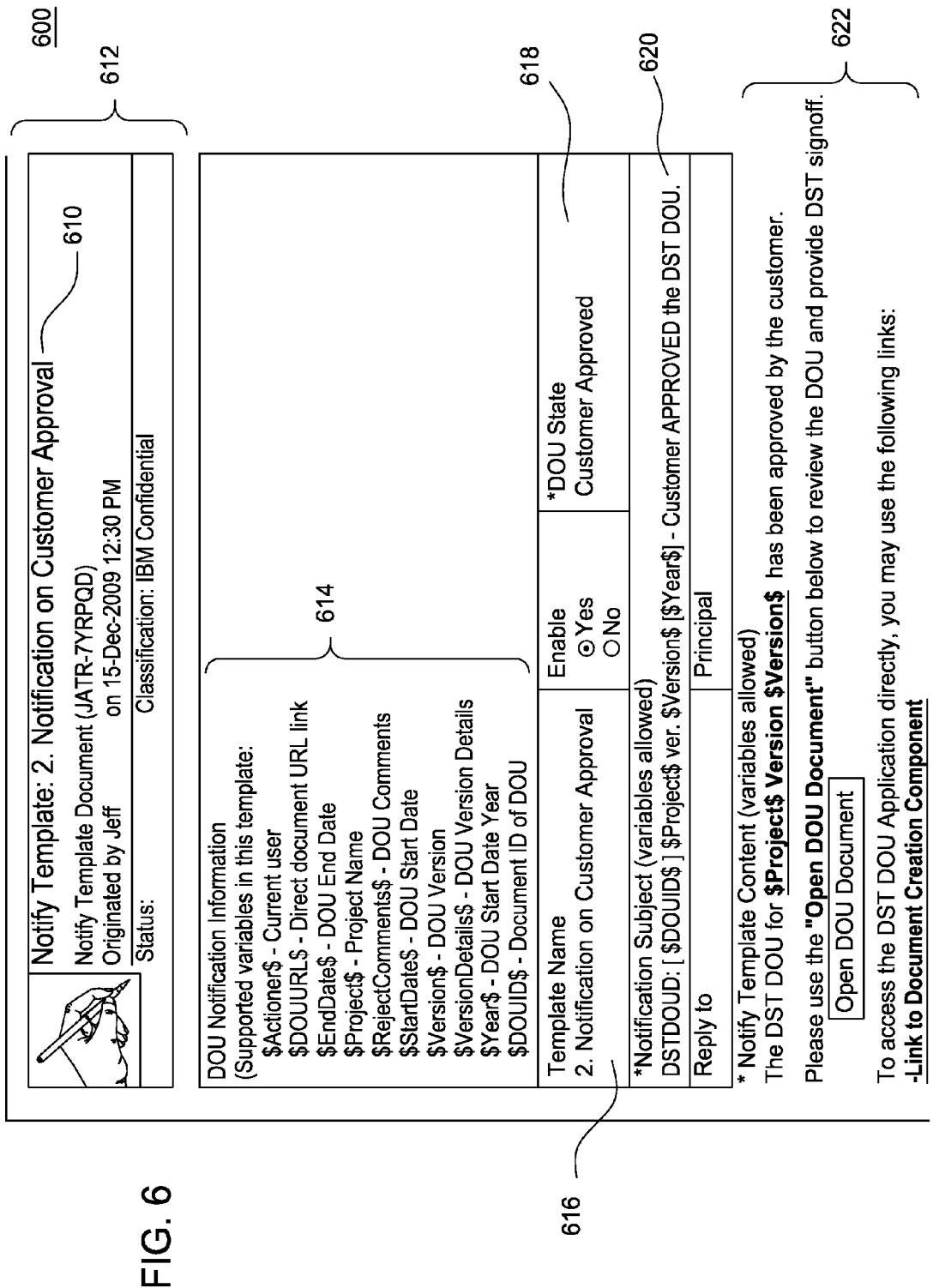
FIG. 6 is a screenshot of an exemplary notify template, according to one embodiment of the present invention.

Referring now to FIG. 6, FIG. 6 is a screenshot of an exemplary notify template, according to one embodiment of the present invention. As shown, the screenshot 600 includes a header portion 610, which generally contains metadata about the template. For example, in the depicted embodiment, the header portion 612 contains information such as the name 610 of the template (i.e., "Notify Template: 2. Notification on Customer Approval"), the creator of the document (i.e., "Jeff"), and a date of creation for the document (i.e., "15-Dec-2009 12:30 PM"). Of course, the depicted embodiment is for illustrative purposes only, and more generally any data or metadata associated a template may be included in a header portion 610.

Additionally, the screenshot 600 includes a notification information portion 614, which contains a listing of variables that may be used in the notification. The variables are generic entities that may be populated with document-specific information when a notification is generated using the notification template. As shown, the variables are designated by a variable name encapsulated by "$" characters. However, one of ordinary skill in the art will quickly understand that variable fields may be designated by any number of other different naming techniques.

The screenshot 600 also includes a name 616 for the notification template. In the depicted embodiment, the name 616 of the notification template in the body of the template corresponds to the name 610 of the template in the header portion 612. Additionally, the screenshot 600 includes a current state 618 of the document of understanding which will trigger the notification template (i.e., "Customer Approved"). Thus, in the depicted embodiment, the document creation component 245 is configured to generate a notification using the depicted notification template upon customer approval of the associated document of understanding.

As an example, in response to the document creation component 245 receiving an approval for a submitted document, the document creation component 245 may generate an email notification using the depicted notification template. Continuing this example, the document creation component 245 may then populate the generated email notification with data relating to the approved document, and then send the email notification to the document administrators to inform them of the approval. Of course, other types of notifications may be generated using the depicted template, with examples including, without limitation, instant messaging applications, browser pop-up windows, SMS messages, voice messages (e.g., using a text-to-speech synthesizer), and so on.

The screenshot 600 additionally shows a subject line 620 for notifications generated using the template. As shown, the subject line 620 contains a number of static fields, such as the text "Customer APPROVED the DST DOU." Generally, the static fields may remain unchanged when notifications are generated using the notification template. The subject line 620 also includes a plurality of different variable fields, which may be populated with information when a notification is generated using the template. For example, the depicted subject line 620 contains the "$Project$" variable field, which may be populated with a project name when a notification is generated using the template.

Advantageously, embodiments provide a more efficient approval process for created documents of understanding by allowing the use of variables in the subject line of the notification. That is, because the notification templates 355 may be reused across multiple different projects and service agreements, document administrator may save the time and effort of recreating the notifications for each separate project and service agreement. Additionally, as discussed above, although the templates 350 are described herein in conjunction with a document creation component 245, such a description is for illustrative purposes only, and one of ordinary skill in the art will recognize that the templates 350 may be used in numerous other contexts as well.

Furthermore, the screenshot 600 also shows a body section 622 of the notification template. Generally, the body section 622 includes the content of the notification, and may include static content or variable content. Additionally, similar to the notification subject 620, the body section 622 may contain variable fields that may later be populated with one or more data values. For example, the depicted body section 622 contains the variable field "$Project$", which reflects a project name associated with a project the template is used with. By including variable fields in the notification template 600, embodiments of the invention enable the notification template to be used with multiple different projects. For example, the depicted notification template 600 may generally be used for the creation of a notification whenever any document of understanding is approved by a customer.

In addition, content in the body section 622 of the notify template may include various formatting styles and options. For example, in the depicted embodiment, the variable field "$Project$" in the body section 622 of the template is formatted using bold, underlined text. As discussed above, when a notification is generated using the depicted notify template 600, the "$Project$" variable field may be populated with the name of a project associated with the generated notification. Additionally, according to embodiments of the invention, the populated project name may also be formatted according to the formatting specified for the variable field in the notify template 600. As an example, assume the name of a particular project is "Web Hosting Services." In this example, when a notification is generated using the depicted template, the "$Project$" variable may be replaced in the notification with the text "Web Hosting Services," and this text may be bolded and underline, based on the formatting in the template.

Advantageously, embodiments of the invention allow users to create visually appealing notify templates by specifying the formatting of the generated notification in the associated template. Furthermore, because such formatting is visually depicted in the template (e.g., the variable name is shown as bolded and underlined), embodiments allow less sophisticated users to still create intricate and visually appealing templates. Additionally, by populating the variable fields with contextual data associated with the notification, embodiments enable the notify templates to be used and re-used in a number of different contexts. As an example, a single notification template may be used with a number of different projects, as the variable fields within the template may be populated with project-specific data. By doing this, embodiments of the invention provide a more efficient content generation process.

Figure 7:
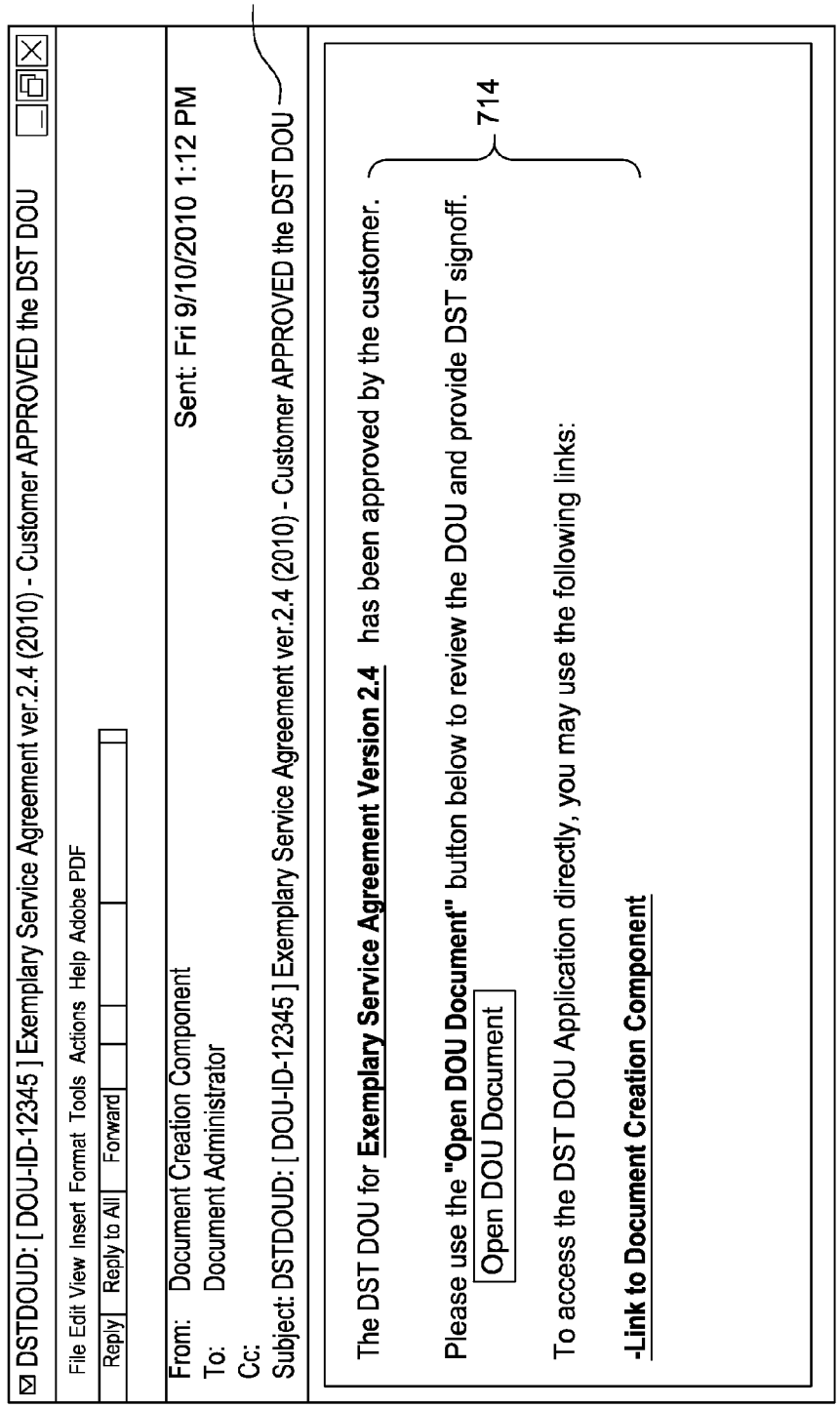
FIG. 7 is a screenshot of notification generated using the notify template of FIG. 6, according to one embodiment of the present invention.

FIG. 7 is a screenshot of notification generated using the notify template of FIG. 6, according to one embodiment of the present invention. More specifically, FIG. 7 shows an exemplary email message 700, generated according to the notification template described above and depicted in FIG. 6. Additionally, for purposes of this example, assume that the notification email message 700 is generated responsive to customer approval of an associated document of understanding. Here, the email notification 700 contains a header portion 710, which includes a sender (i.e., "Document Creation Component") and a recipient (i.e., "Document Administrator"). Additionally, as discussed above, although aspects of the invention are described using an email notification as an example, embodiments may be configured to use other types of messaging and communication systems as well.

The email notification 700 also contains a subject line 712, which corresponds to the notification subject 620 shown in FIG. 6. As shown here, the variable fields in the subject line 712 have been populated using data and metadata relating to the associated document of understanding. For example, the "$DOUID$" field of the notification subject 620 has been populated with the document ID number "DOU-ID-12345" for the associated document of understanding. As a second example, the "$Project$" field of the notification subject 620 has been populated with the project name for the associated document of understanding, and which in the depicted example is "Exemplary Service Agreement." Advantageously, by including variable fields in the subject line of the notification template, embodiments of the invention enable the notification template to be used for generating notifications in any number of different contexts. In turn, this improves the efficiency of the notification process, since a single notification template may be created and then repeatedly reused for different projects, as opposed to creating a separate notification messages for each individual project.

Additionally, the exemplary email notification 700 contains a body section 714, which corresponds to the body section 622 of the notification template 600 shown in FIG. 6. As shown, the variable fields in the body section 622 have been populated with data relating to the document the notification is generated for. For instance, the "$Project$" variable field has been populated with the value "Exemplary Service Agreement." In one embodiment of the invention, a variable field may be populated with a plurality of data values. For example, a $PricingTable$ variable field may be populated with a table containing up-to-date pricing information that is associated with the document. In one embodiment, such a table may further be generated according to one or more table templates 360.

The body section 714 in the depicted embodiment also contains interactive content, such as the button labeled "Open DOU Document," which a recipient of the notification may use to view the document associated with the notification. When creating a notification based on a notify template, the document creation component 245 may configure any interactive content in the notification (e.g., a button) with contextual information related to the notification. For example, in the depicted embodiment, the button labeled "Open DOU Document" may be configured to, when accessed, redirect the user to the specific document of understanding that has been approved by the customer. The body section 714 may include multimedia content as well (not shown). Examples of such multimedia content include, without limitation, images, animations, sounds, videos, and so on. In one embodiment, the multimedia content may also be interactive content. For example, such an embodiment may include an image of a document, rather than a button labeled "Open DOU Document," that when accessed by the recipient of the notification, directs the recipient to the associated document.

Figures 8, 9:
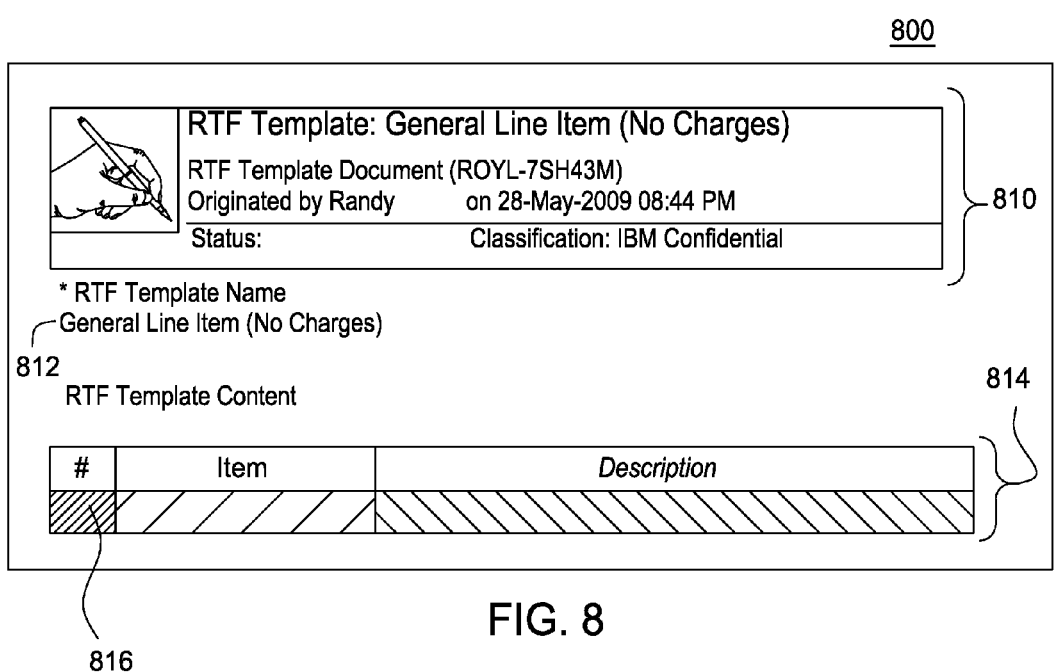
FIG. 8 is a screenshot of an exemplary table template, according to one embodiment of the invention.
FIG. 9 is a screenshot of an exemplary table generated using the table template of FIG. 8, according to one embodiment of the present invention.

FIG. 8 is a screenshot of an exemplary table template, according to one embodiment of the invention. As shown, the table template 800 includes a header portion 810. Similar to the header portion 610 shown in FIG. 6 and discussed above, the header portion 810 generally contains metadata about the table template. The table template 800 also contains a template name 812. In the depicted embodiment, the template name 812 is "General Line Item (No Charges)."

The table template 800 also includes template content 814. Generally, a user (e.g., a document administrator) may create a table template using various formatting parameters and options for fields within the table. These formatting parameters may then be applied to any table generated using the table template. Exemplary formatting parameters may include, without limitation, a number of columns for a table, a number of rows for a table, a width for each column in the table, and a length of each row in the table. Additionally, in one embodiment, a table template may specify dimensions for the generated table. For example, a table template may specify that tables generated using the template should be 500 pixels wide by 1000 pixels tall. The document creation component 245 may then adjust the width of the columns within the table and the length of the rows within the table accordingly. Advantageously, by specifying table dimensions in a table template, document creation component 245 may use the table template to generate more uniform tables, and thus may improve the visual appearance of the generated content. In one embodiment, the table template may specify minimum and/or maximum dimensions for the generated tables. As an example, a table template may specify that generated tables should be no smaller than 500 pixels wide by 300 pixels tall. By doing this, embodiments may create more visually appealing content, by ensuring that tables within the generated content are more uniform in dimensions, but such tables may also scale to properly encapsulate larger amounts of data.

As shown, the template content 814 is represented by a table containing three columns with column headers (i.e., "#", "Item", and "Description"). Additionally, each of these columns is shown as having a different column width. For instance, the first column (with header "#") is narrower than the third column (with header "Description"). As such, the user creating the table template 800 may format the template 800 according to how the user wishes tables generated using the template to appear. The template content 814 also includes formatting for the fields in the table. For example, the field 816 is shown as shaded. Accordingly, when a table is generated using the table template 800, the fields in the generated table corresponding to field 816 may be shaded as well. Although the current example is given in the context of shading table cells, more generally the generated table and values within the generated table may inherit any type of formatting from the table template.

Advantageously, embodiments of the invention provide an improved template creation process by allowing the user to format the table template 800 using a graphical interface that depicts how the resulting generated tables will also be formatted. Additionally, by allowing users to specify an appearance of the generated table by adjusting the visual characteristics of the table template 800, embodiments of the invention allow less sophisticated users to create visually pleasing table templates. That is, it may be difficult for less sophisticated users to use solutions that requiring the user to reference a plurality of different formatting codes. Additionally, these solutions require a table be generated using the specified formatting codes before the user may view the final visual appearance of the table. By visually depicting the formatting in the table template 800, embodiments of the invention provide an improved template creation process that may be efficiently utilized even by less sophisticated users.

FIG. 9 is a screenshot of an exemplary table generated using the table template of FIG. 8, according to one embodiment of the present invention. As shown, the screenshot 900 includes a table 910, which includes three columns, similar to the table template 800. The columns of the table 910 contain column headers "#", "Item", and "Description." Additionally, the formatting of the table 910 reflects the formatting of the table template 800. For instance, the column widths of the columns in the table 910 correspond to the column widths of the columns in the table template 800.

However, unlike the table template 800, the generated table 910 has been populated with data. In this particular example, the document creation component 245 has populated the table 910 with information relating to a particular service agreement. Of note, the populated data in the table 910 retains the formatting specified in the associated table template 800. Thus, as shown, the fields 912 in the table 910 are shaded, similar to the field 816 of the table template 800. As discussed above, although the formatting in the depicted embodiment relates to shading particular fields of the table, more generally, any type of formatting capable of being used in conjunction with a table or a related entity may be used.

Figure 10:
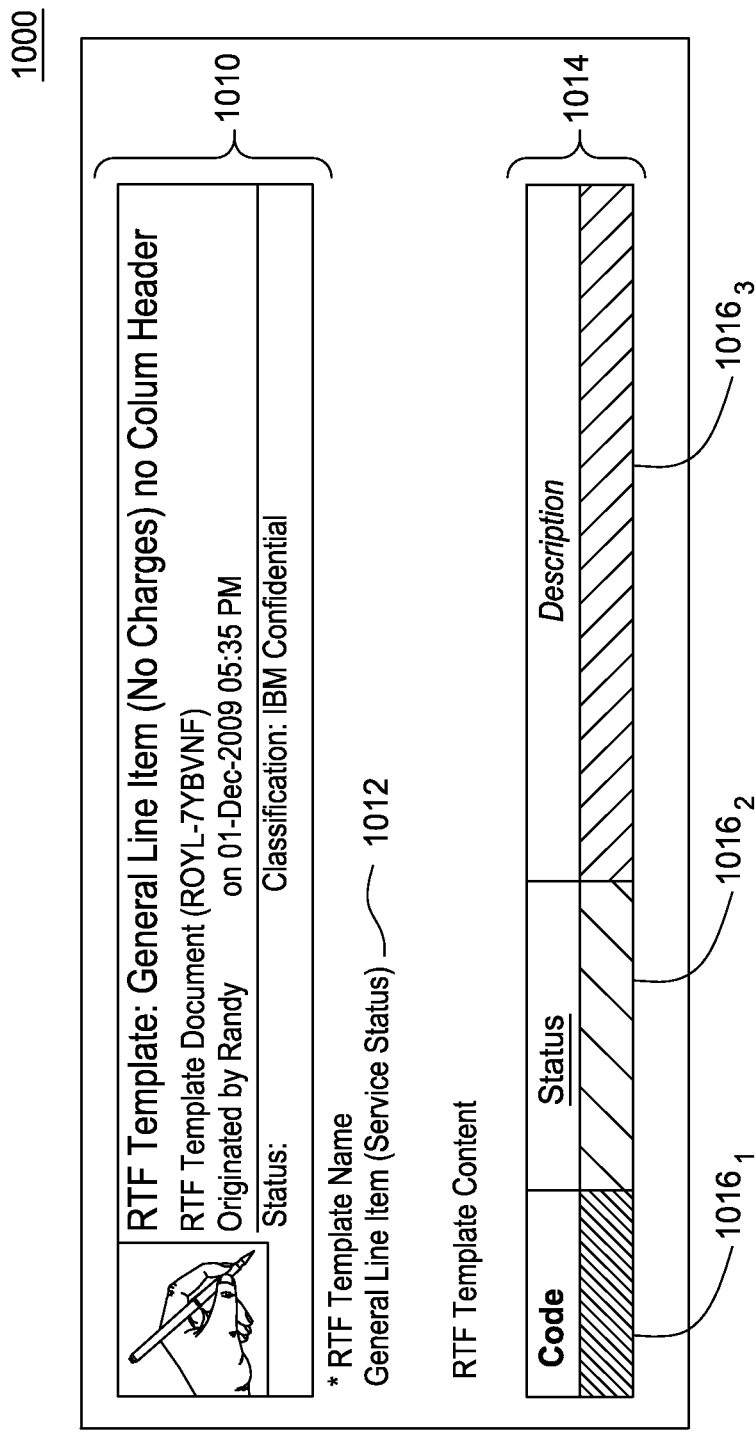
FIG. 10 is a screenshot of an exemplary table template, according to one embodiment of the present invention.

FIG. 10 is a screenshot of an exemplary table template, according to one embodiment of the present invention. As shown, the depicted table template 1000 includes a header portion, which generally includes metadata describing the table template 1000. The table template 1000 further includes a template name, which in the depicted example is "General Line Item (Service Status)." The table template 1000 also contains template content 1014. In the depicted example, the template content 1014 is represented by a table containing three columns, with column headers "Code", "Status" and "Description." Furthermore, each of the columns in the template content 1014 is associated with different formatting parameters. For instance, the column 1016$_1$ is formatted with bold text and a shaded background of a first color. As a second example, the column 1016$_2$ is formatted with underlined text and a shaded background of a second color. As discussed above, embodiments of the invention enable users to specify particular formatting options for table templates, and tables created using these table templates may then be formatting using these same formatting options. By doing this, embodiments of the invention may provide a graphical interface that allows users to see the visual appearance that tables created using the table template will have, and which in turn allows less sophisticated to create table templates that will produce visually pleasing tables.

FIG. 11 is a screenshot of an exemplary notification including a table generated using the table template of FIG. 10, according to one embodiment of the present invention. More specifically, FIG. 10 shows an exemplary email message 1100, generated according to a notification template and the table template described above and depicted in FIG. 10. Additionally, for purposes of this example, assume that the notification email message 1100 is generated responsive to customer approval of an associated document of understanding. Here, the email notification 1100 contains a header portion 1110, which includes a sender (i.e., "Document Creation Component") and a recipient (i.e., "Document Administrator"). The notification email message 1100 further contains a subject line 1112. As discussed above, the subject line may correspond to a notification subject of a notification template (e.g., notification subject 620), and may contain static fields and/or variable fields.

As shown, the generated notification 1100 also contains a body section 1114, which contains both content generated from static fields and variable fields in a template (e.g., the notification template shown in FIG. 6). As discussed above, content in the generated notification may inherit the formatting of the fields in the template. For example, if a variable field in the template is formatted as centered (i.e., as a font alignment) and underlined text, the corresponding one or more data values inserted into the generated content may also be formatted as centered and underlined. Advantageously, this allows a user to visualize the formatting that content generated using the template will have, while the user is creating the template. As such, embodiments of the invention provide a more intuitive and efficient interface for creating templates, and one that may be fully utilized even by less sophisticated users.

Additionally, the body section 1114 of the depicted notification 1100 includes a table 1116, generated according to the table template 1000 shown in FIG. 10. As discussed above, the table template 1000 specified that the first column 1016$_1$ is shaded with a first color and the second column 1016$_2$ is shaded with a second color. Accordingly, when the table 1116 is generated (e.g., by the document creation component 245), values inserted into the first column 1118$_1$ are shaded with the first color, and the values inserted into the second column 1118$_2$ are shaded with a second color. Additionally, the values inserted into the generated table are formatted according to the font style specified in the template 1000. For instance, the values in the first column 1118$_1$ are formatted as bold, whereas the values in the second column 1118$_2$ are formatted as underlined.

As discussed above, such a notification may be generated using one or more templates, which specify both the content of the notification and a formatting for the content. In the depicted example, the notification 1100 is generated using a notification template (e.g., the template 600) in conjunction with a table template (e.g., the template 1000). By enabling users to create templates that may be used in a variety of different contexts, embodiments of the invention improve the efficiency of the content generation process. Furthermore, because embodiments provide an interface for creating templates which reflects the formatting that content created using the templates will have, embodiments enable all types of users to create intricate templates that may be used to create visually appealing content.

Figure 12:
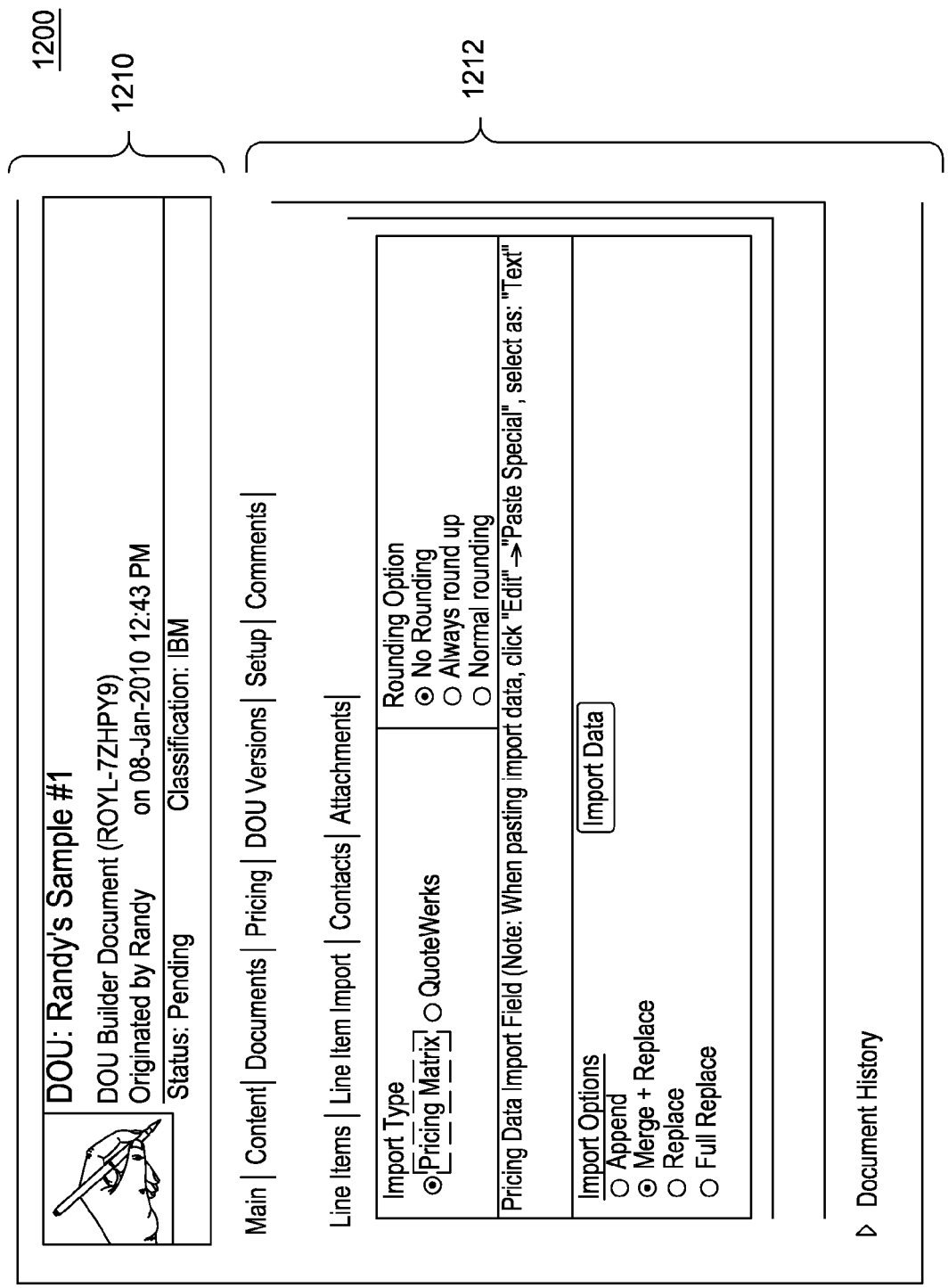
FIG. 12 is a screenshot of an exemplary data import page of a document creation component, according to one embodiment of the present invention.

FIG. 12 is a screenshot of an exemplary data import page of a document creation component, according to one embodiment of the present invention. Generally, the data import page is used by the document creation component 245 to import data from an external data source. For example, in one embodiment, the document creation component 245 may import data (e.g., up-to-date pricing data) from an external database. As shown, the screenshot 1200 includes a header portion 1210 and an import configuration portion 1212. As discussed above, the header portion 1210 generally contains metadata describing the associated document of understanding.

The import configuration portion 1212 of the screenshot 1200 includes a number of different settings for importing the data. For instance, the import configuration portion 1212 includes an import type, rounding options for rounding the imported data, and an import conflict option (i.e., "Append," "Merge+Replace," "Replace," "Full Replace"). For example, in one embodiment, the document creation component 245 may be configured to import data from two or more external sources. In such a scenario, the document administrator may specify an action to be taken in the event that particular imported data records conflict with one another. For example, the document creation component 245 may be configured to always give preference to a particular external data source, and to always replace conflicting existing values when importing from the particular external data source (e.g., using the "Replace" option). Of course, the depicted data import page is for illustrative purposes only, and one of ordinary skill in the art will recognize that any interface capable of performing the functions described herein may be used.

In one embodiment, the data import page 1200 may be used in conjunction with a table template to generate and populate a table of data. For instance, the table template may specify a formatting style for the generated table, while the import page may specify a data source (e.g., a database) from which data should be imported. As an example, the document creation component 245 may generate a table and populate the table with data retrieved from a database. The generated table may then be formatted based on a specified table template. As discussed above, examples of such formatting may include the width of columns in the table, the length of rows in the table, the overall dimensions of the table, the shading of cells within the table, and so on.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of using template components to programmatically standardize and streamline creation and adoption of different types of computing service agreements of a vendor of computing services, the computer-implemented method comprising, by operation of one or more computer processors:

providing a graphical user interface for interactively creating a plurality of computing service agreement templates based on a plurality of computing service agreement template components;

automatically generating, based on selections of one or more of the plurality of computing service agreement template components via the graphical user interface, the plurality of computing service agreement templates, each corresponding to a different type of computing service agreement of the vendor, wherein a first of the plurality of computing service agreement templates specifies a placeholder field and one or more formatting options for any text that populates the placeholder field, the placeholder field having a placeholder field name, wherein the graphical user interface depicts the placeholder field name itself as being formatted based on the one or more formatting options, wherein generating the plurality of computing service agreement templates comprises:

automatically inserting, into the first computing service agreement template, a table template specifying one or more formatting parameters separate from the one or more formatting options, wherein the one or more formatting parameters are visually depicted on the graphical user interface; and automatically inserting, into the first computing service agreement template, one or more placeholder fields including the placeholder field, wherein the graphical user interface depicts, for the one or more placeholder fields, a corresponding placeholder field name designating a respective source from which to retrieve content of the respective placeholder field, wherein each placeholder field comprises a variable field, wherein each placeholder field name comprises a variable name;

wherein the placeholder field name is formatted based on the one or more formatting options and is positioned within the graphical user interface at a respective, user-specified position, in order to visually convey that the one or more formatting options and positioning are to be similarly applied to any text that populates the placeholder field in every computing service agreement generated based on the first computing service agreement template;

wherein for each variable field of the first legal agreement template: (i) one or more data values are retrieved from a data structure identified by the respective variable name of the respective variable field and (ii) the respective variable field is populated with corresponding text, by inserting the associated one or more data values into a first of the plurality of legal agreements, at a position corresponding to the user-specified position of the variable field in the first legal agreement template, wherein the associated one or more data values are formatted based on the one or more formatting options specified for the variable field;

responsive to an occurrence of a predefined event, automatically generating, based on the first computing service agreement template, a first computing service agreement of a first type and between the vendor and the client, including populating the placeholder field with specified text that is formatted based on the one or more formatting options, wherein the first computing service agreement does not include the placeholder field name; and orchestrating, based on only a single, centralized, master copy of the first computing service agreement, a predetermined workflow for the vendor and the client in order to collectively review, revise, and approve the first computing service agreement as an effective agreement between the vendor and the client, including maintaining, over time, a state field of the first computing service agreement to reflect a current approval state of the first computing service agreement, wherein the occurrence of the predefined event is signified via a notification generated based on the table template, wherein the notification includes a plurality of item entries, wherein generating the first computing service agreement comprises:

automatically inserting one or more static fields in the first computing service agreement at a position corresponding to a placement position of the one or more static fields in the first computing service agreement template, wherein the first computing service agreement includes a table based on the table template, wherein at least one field in the generated table is formatted according to the one or more formatting parameters specified in the table template; and upon approval of the first computing service agreement as an effective agreement between the vendor and the client of the vendor, storing an indication that the first computing service agreement is an effective agreement between the vendor and the client;

wherein the plurality of computing service agreement template components are used in order to programmatically standardize and streamline creation and adoption of different types of computing service agreements of the vendor;

wherein includable in the one or more placeholder fields is each placeholder field selected from: (i) a current user of the first computing service agreement, (ii) a document identifier of the first computing service agreement, (iii) a uniform resource identifier of the first computing service agreement, (iv) a start date of the first computing service agreement, (v) an end date of the first computing service agreement, (vi) a project name of the first computing service agreement, (vii) rejection comments of the first computing service agreement, (viii) a version of the first computing service agreement, and (ix) version details of the first computing service agreement;

wherein includable in the one or more formatting options are: (i) a font, (ii) a font size, (iii) a font style, (iv) a font color, and (v) a font alignment;

wherein includable in the one or more formatting parameters are: (i) a number of columns, (ii) a number of rows, (iii) a column width, (iv) a row height, and (v) table dimensions;

wherein includable in the plurality of item entries is an entry for each item selected from a specified web hosting service, specified web hosting hardware, specified support services, and specified terms and conditions, wherein each item entry comprises a plurality of columns, wherein includable in the plurality of columns is each column selected from a distinct item code, an item approval status, and an item description, each column formatted in a distinct manner based on the one or more formatting parameters;

wherein includable in the table is each computing field selected from: (i) a web server that the first computing service agreement pertains to, (ii) a network address that the first computing service agreement pertains to, the network address comprising a static Internet Protocol (IP) address, (iii) a maximum number of database users that the first computing service agreement pertains to, (iv) a specified database instance that the first computing service agreement pertains to, (v) and a specified amount of storage that the first computing service agreement pertains to; wherein each field is formatted in a distinct manner based on the one or more formatting parameters.

2. A computer program product of using template components to programmatically standardize and streamline creation and adoption of different types of computing service agreements of a vendor of computing services, the computer program product comprising:

a non-transitory computer-readable medium having program code embodied therewith, the program code executable by one or more computer processors to:

provide a graphical user interface for interactively creating a plurality of computing service agreement templates based on a plurality of computing service agreement template components;

automatically generate, based on selections of one or more of the plurality of computing service agreement template components via the graphical user interface, the plurality of computing service agreement templates, each corresponding to a different type of legal agreement of the vendor, wherein a first of the plurality of computing service agreement templates specifies a placeholder field and one or more formatting options for any text that populates the placeholder field, the placeholder field having a placeholder field name, wherein the graphical user interface depicts the placeholder field name itself as being formatted based on the one or more formatting options, wherein generating the plurality of computing service agreement templates comprises:

automatically inserting, into the first computing service agreement template, a table template specifying one or more formatting parameters separate from the one or more formatting options, wherein the one or more formatting parameters are visually depicted on the graphical user interface; and automatically inserting, into the first computing service agreement template, one or more placeholder fields including the placeholder field, wherein the graphical user interface depicts, for the one or more placeholder fields, a corresponding placeholder field name designating a respective source from which to retrieve content of the respective placeholder field, wherein each placeholder field comprises a variable field, wherein each placeholder field name comprises a variable name;

wherein the placeholder field name is formatted based on the one or more formatting options and is positioned within the graphical user interface at a respective, user-specified position, in order to visually convey that the one or more formatting options and positioning are to be similarly applied to any text that populates the placeholder field in every computing service agreement generated based on the first computing service agreement template;

wherein for each variable field of the first legal agreement template: (i) one or more data values are retrieved from a data structure identified by the respective variable name of the respective variable field and (ii) the respective variable field is populated with corresponding text, by inserting the associated one or more data values into a first of the plurality of legal agreements, at a position corresponding to the user-specified position of the variable field in the first legal agreement template, wherein the associated one or more data values are formatted based on the one or more formatting options specified for the variable field;

responsive to an occurrence of a predefined event, automatically generate, based on the first computing service agreement template, a first computing service agreement of a first type and between the vendor and the client, including populating the placeholder field with specified text that is formatted based on the one or more formatting options, wherein the first computing service agreement does not include the placeholder field name; and orchestrating, based on only a single, centralized, master copy of the first computing service agreement, a predetermined workflow for the vendor and the client in order to collectively review, revise, and approve the first computing service agreement as an effective agreement between the vendor and the client, including maintaining, over time, a state field of the first computing service agreement to reflect a current approval state of the first computing service agreement, wherein the occurrence of the predefined event is signified via a notification generated based on the table template, wherein the notification includes a plurality of item entries, wherein generating the first computing service agreement comprises:

automatically inserting one or more static fields in the first computing service agreement at a position corresponding to a placement position of the one or more static fields in the first computing service agreement template, wherein the first computing service agreement includes a table based on the table template, wherein at least one field in the generated table is formatted according to the one or more formatting parameters specified in the table template; and upon approval of the first computing service agreement as an effective agreement between the vendor and the client of the vendor, store an indication that the first computing service agreement is an effective agreement between the vendor and the client;

wherein the plurality of computing service agreement template components are used in order to programmatically standardize and streamline creation and adoption of different types of computing service agreements of the vendor;

wherein includable in the one or more placeholder fields is each placeholder field selected from: (i) a current user of the first computing service agreement, (ii) a document identifier of the first computing service agreement, (iii) a uniform resource identifier of the first computing service agreement, (iv) a start date of the first computing service agreement, (v) an end date of the first computing service agreement, (vi) a project name of the first computing service agreement, (vii) rejection comments of the first computing service agreement, (viii) a version of the first computing service agreement, and (ix) version details of the first computing service agreement;

wherein includable in the one or more formatting options are: (i) a font, (ii) a font size, (iii) a font style, (iv) a font color, and (v) a font alignment;

wherein includable in the one or more formatting parameters are: (i) a number of columns, (ii) a number of rows, (iii) a column width, (iv) a row height, and (v) table dimensions;

wherein includable in the plurality of item entries is an entry for each item selected from a specified web hosting service, specified web hosting hardware, specified support services, and specified terms and conditions, wherein each item entry comprises a plurality of columns, wherein includable in the plurality of columns is each column selected from a distinct item code, an item approval status, and an item description, each column formatted in a distinct manner based on the one or more formatting parameters;

wherein includable in the table is each computing field selected from: (i) a web server that the first computing service agreement pertains to, (ii) a network address that the first computing service agreement pertains to, the network address comprising a static Internet Protocol (IP) address, (iii) a maximum number of database users that the first computing service agreement pertains to, (iv) a specified database instance that the first computing service agreement pertains to, (v) and a specified amount of storage that the first computing service agreement pertains to; wherein each field is formatted in a distinct manner based on the one or more formatting parameters.

3. A system of using template components to programmatically standardize and streamline creation and adoption of different types of computing service agreements of a vendor of computing services, the system comprising:

one or more computer processors;

a memory containing a program which, when executed by the one or more computer processors, performs an operation comprising:

providing a graphical user interface for interactively creating a plurality of computing service agreement templates based on a plurality of computing service agreement template components;

automatically generating, based on selections of one or more of the plurality of computing service agreement template components via the graphical user interface, the plurality of computing service agreement templates, each corresponding to a different type of computing service agreement of the vendor and the client, wherein a first of the plurality of computing service agreement templates specifies a placeholder field and one or more formatting options for any text that populates the placeholder field, the placeholder field having a placeholder field name, wherein the graphical user interface depicts the placeholder field name itself as being formatted based on the one or more formatting options, wherein generating the plurality of computing service agreement templates comprises:

automatically inserting, into the first computing service agreement template, a table template specifying one or more formatting parameters separate from the one or more formatting options, wherein the one or more formatting parameters are visually depicted on the graphical user interface; and automatically inserting, into the first computing service agreement template, one or more placeholder fields including the placeholder field, wherein the graphical user interface depicts, for the one or more placeholder fields, a corresponding placeholder field name designating a respective source from which to retrieve content of the respective placeholder field, wherein each placeholder field comprises a variable field, wherein each placeholder field name comprises a variable name;

wherein the placeholder field name is formatted based on the one or more formatting options and is positioned within the graphical user interface at a respective, user-specified position, in order to visually convey that the one or more formatting options and positioning are to be similarly applied to any text that populates the placeholder field in every computing service agreement generated based on the first computing service agreement template;

wherein for each variable field of the first legal agreement template: (i) one or more data values are retrieved from a data structure identified by the respective variable name of the respective variable field and (ii) the respective variable field is populated with corresponding text, by inserting the associated one or more data values into a first of the plurality of legal agreements, at a position corresponding to the user-specified position of the variable field in the first legal agreement template, wherein the associated one or more data values are formatted based on the one or more formatting options specified for the variable field;

responsive to an occurrence of a predefined event, automatically generating, based on the first computing service agreement template, a first computing service agreement of a first type and between the vendor and the client, including populating the placeholder field with specified text that is formatted based on the one or more formatting options, wherein the first computing service agreement does not include the placeholder field name; orchestrating, based on only a single, centralized, master copy of a first of the plurality of computing service agreements, a predetermined workflow for the vendor and the client in order to collectively review, revise, and approve the first computing service agreement as an effective agreement between the vendor and the client, including maintaining, over time, a state field of the first computing service agreement to reflect a current approval state of the first computing service agreement, wherein the occurrence of the predefined event is signified via a notification generated based on the table template, wherein the notification includes a plurality of item entries, wherein generating the first computing service agreement comprises:

automatically inserting one or more static fields in the first computing service agreement at a position corresponding to a placement position of the one or more static fields in the first computing service agreement template, wherein the first computing service agreement includes a table based on the table template, wherein at least one field in the generated table is formatted according to the one or more formatting parameters specified in the table template; and upon approval of the first computing service agreement as an effective agreement between the vendor and the client of the vendor, storing an indication that the first computing service agreement is an effective agreement between the vendor and the client;

wherein the plurality of computing service agreement template components are used in order to programmatically standardize and streamline creation and adoption of different types of computing service agreements of the vendor;

wherein includable in the one or more placeholder fields is each placeholder field selected from: (i) a current user of the first computing service agreement, (ii) a document identifier of the first computing service agreement, (iii) a uniform resource identifier of the first computing service agreement, (iv) a start date of the first computing service agreement, (v) an end date of the first computing service agreement, (vi) a project name of the first computing service agreement, (vii) rejection comments of the first computing service agreement, (viii) a version of the first computing service agreement, and (ix) version details of the first computing service agreement;

wherein includable in the one or more formatting options are: (i) a font, (ii) a font size, (iii) a font style, (iv) a font color, and (v) a font alignment;

wherein includable in the one or more formatting parameters are: (i) a number of columns, (ii) a number of rows, (iii) a column width, (iv) a row height, and (v) table dimensions;

wherein includable in the plurality of item entries is an entry for each item selected from a specified web hosting service, specified web hosting hardware, specified support services, and specified terms and conditions, wherein each item entry comprises a plurality of columns, wherein includable in the plurality of columns is each column selected from a distinct item code, an item approval status, and an item description, each column formatted in a distinct manner based on the one or more formatting parameters;

wherein includable in the table is each computing field selected from: (i) a web server that the first computing service agreement pertains to, (ii) a network address that the first computing service agreement pertains to, the network address comprising a static Internet Protocol (IP) address, (iii) a maximum number of database users that the first computing service agreement pertains to, (iv) a specified database instance that the first computing service agreement pertains to, (v) and a specified amount of storage that the first computing service agreement pertains to; wherein each field is formatted in a distinct manner based on the one or more formatting parameters.

\* \* \* \* \*